(12) United States Patent
Schultze et al.

(10) Patent No.: US 7,760,753 B2
(45) Date of Patent: Jul. 20, 2010

(54) METHOD FOR DATA TRANSMISSION

(75) Inventors: Stephan Schultze, Lohr (DE); Ludwig Leurs, Lohr (DE); Rigobert Kynast, Lohr (DE); Thomas Schmid, Hafenlohr (DE)

(73) Assignee: Bosch Rexroth AG, Stuttgart (DE)

( * ) Notice: Subject to any disclaimer, the term of this patent is extended or adjusted under 35 U.S.C. 154(b) by 585 days.

(21) Appl. No.: 11/086,003

(22) Filed: Mar. 22, 2005

(65) Prior Publication Data
US 2005/0232296 A1 Oct. 20, 2005

(30) Foreign Application Priority Data
Mar. 24, 2004 (DE) .................. 10 2004 014 793

(51) Int. Cl.
H04B 7/212 (2006.01)
H04L 1/00 (2006.01)
H04J 3/00 (2006.01)

(52) U.S. Cl. .................. 370/442; 370/465; 370/498; 370/337; 370/252; 379/388.01; 455/522

(58) Field of Classification Search .................. 370/442, 370/465, 468, 473, 470, 498, 337, 336, 263, 370/252, 477; 379/388.01; 704/503; 455/522
See application file for complete search history.

(56) References Cited

U.S. PATENT DOCUMENTS

| | | | | |
|---|---|---|---|---|
| 3,748,394 A | * | 7/1973 | Thomas | 370/263 |
| 6,330,247 B1 | * | 12/2001 | Chang et al. | 370/442 |
| 6,831,906 B2 | * | 12/2004 | Malladi et al. | 370/336 |
| 2002/0067699 A1 | * | 6/2002 | Renner et al. | 370/252 |
| 2002/0091838 A1 | | 7/2002 | Rupp et al. | |
| 2002/0114311 A1 | * | 8/2002 | Mazur et al. | 370/347 |
| 2002/0131443 A1 | * | 9/2002 | Robinett et al. | 370/442 |
| 2004/0028071 A1 | * | 2/2004 | Gehring et al. | 370/442 |

FOREIGN PATENT DOCUMENTS

| | | |
|---|---|---|
| EP | 0 550 214 A1 | 9/1993 |
| EP | 1 312 992 A1 | 5/2003 |

OTHER PUBLICATIONS

Georg Faerber: "Feldbus-Technik Heute Und Morgen" Automatisierungstechnik Praxis 36, Nov. 1994, pp. 16-36.

* cited by examiner

*Primary Examiner*—Aung S Moe
*Assistant Examiner*—Jamal Javaid
(74) *Attorney, Agent, or Firm*—Michael J. Striker

(57) ABSTRACT

A method for data transmission between participants communicating by means of a data bus, in which as high a transmission likelihood for additional data as possible is to be assured by providing that in the exchange of data telegrams between the participants within the cycle time $13a$ predetermined for one transmission cycle 13, at least one first and at least one second time slot 11, 12 are used, and the first time slot 11 serves to forward process data and the second time slot 12 serves to forward additional data, and the length of the data telegrams representing the additional data is predeterminable within the length of the corresponding time slot 12.

13 Claims, 1 Drawing Sheet

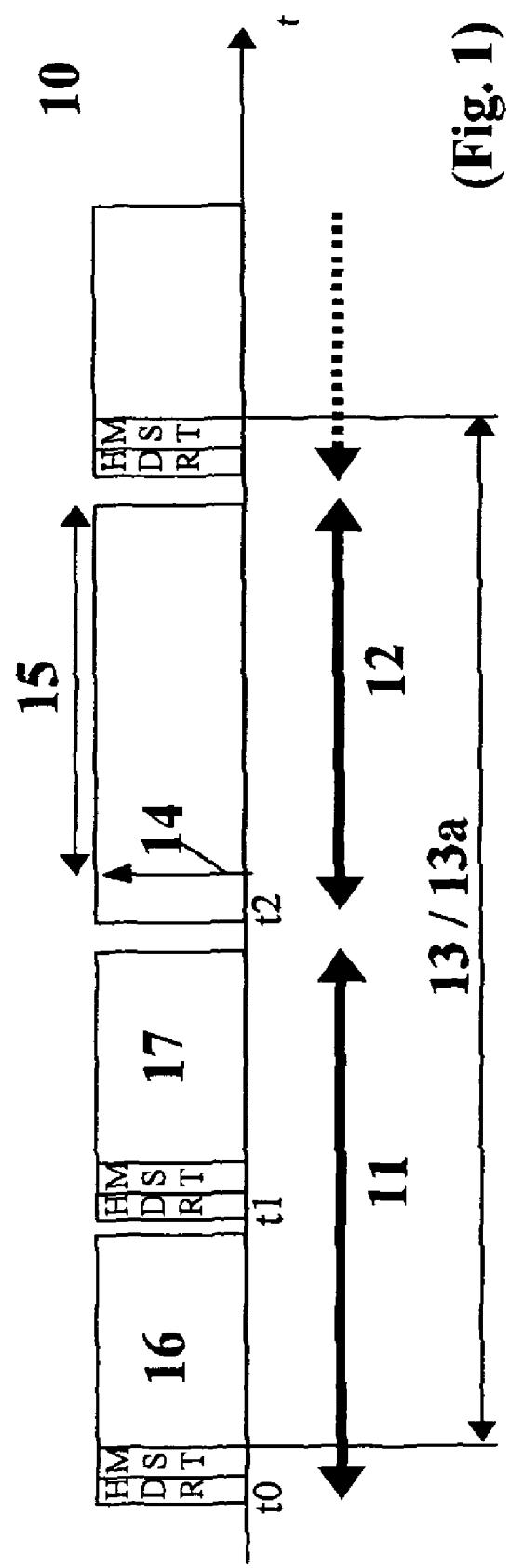
(Fig. 1)

METHOD FOR DATA TRANSMISSION

BACKGROUND OF THE INVENTION

The invention originates in the field of data transmission. It has to do in particular with transmitting real-time data in combination with less time-critical data within one transmission period.

In a communications system, data telegrams are periodically exchanged between stations. Besides this so-called cyclical communication, which is preferably done in real time, there is a need for so-called unplanned or acyclical communication, in which arbitrary protocols may be incorporated within a time slot that is binding for all the participants.

European Patent Disclosure EP 1 312 992 discloses a method for transmitting a higher-level protocol such as TCP/IP without influencing the cyclical data traffic by providing that a subordinate device (slave), by means of an alarm request, initiates the transmission and causes an overriding device (master) to call up further message data sets in the subordinate device by means of an identification data field. The master, using a destination address furnished by the slave, forwards the message data sets on to another slave.

US Patent Disclosure 2002/0091838 shows a method for adapting the data rate in a field bus so that an increasing quantity of data can be handled. A new transmission rate is agreed upon by all the bus participants and used by them for further communication. Upon startup of operation, a new calibration is made among all the participants.

During initial test constructions by the present applicant, it has been found that depending on the participant-specific quantity of data in the real-time channel, situations can occur in which, because the bandwidth is too narrow, required additional data can no longer be transmitted if their telegram length becomes too great. This problem occurs especially when bus participants are turned dynamically on and off. On the assumption that at a transmission rate of 100 MBit/s, for example, a telegram duration of 1500 bytes is intended for acyclical additional data, a time slot required for this would be 1500×8 bits/byte/100 MBit/s=120 µs. On the assumption that a transmission cycle lasts 128 µs, only 8 µs would thus be available for the cyclical real-time data, which in practice would likely be too short.

SUMMARY OF THE INVENTION

It is the object of the invention to solve this problem and assure the highest possible likelihood of transmission for additional data.

The invention attains this object in that for the exchange of data telegrams between the participants within the cycle time predetermined for one transmission cycle, at least one first and one second time slot are used, and the first time slot serves to forward process data and the second time slot serves to forward additional data, and the length of the data telegrams representing the additional data is predeterminable within the length of the corresponding time slot.

The transmission cycle is understood here to mean the period length of a repeating data frame. The data frame includes at least two channels (time slots). The process data are as a rule time-critical data, while the additional data include data that are less time-critical, such as configuration data. These configuration data can be input via a user interface or predetermined by means of a controller. The transmission, in contrast to real-time data, must as a rule be assured within a longer time frame (milliseconds). The data telegrams may contain data bytes, checksums, addresses, and other information for assuring the transmission and allocation of the data.

This adaptation of the data telegram length in the additional channel is linked with chronological peripheral conditions, so that depending on the time slot length in the process data channel, variable data telegram lengths can be transmitted in the additional channel. Dynamic adaptation as a function of the data load is thus readily feasible without affecting operation for process data. This adaptation can even vary from one transmission cycle to another, depending on how much "remaining time" is still available in the additional data slot. The advantage of the method is that the data transmitted in both time slots can be forwarded and varied entirely independently of one another and can be adapted to the operating conditions.

It would also be advantageous if the process data are transmitted in real time and cyclically, that is, upon each cycle. This would make the method suitable for use in field buses for master control communication and make selective tunneling of additional data possible without making any change in the transmission rate. "Real time" means here that time-critical data must be available for processing at the receiver before a data loss occurs from buffer overruns or asynchronism, and so that jerky and/or uniform courses of motion result, for example upon triggering of a servo motor. This can be achieved by resource-sparing programming, a high enough clock speed, and the use of autonomic hardware modules for relieving the CPU, and by using suitable operating systems (Nukleus+, etc.).

If process data and/or additional data are distributed over more than two time slots of the same and/or different length and/or in a different order within one transmission cycle, the result is flexible utilization of the transmission time available.

A method according to the invention in which the beginning of transmission for a data telegram of the additional data within the length of the corresponding time slot is variable increases the flexibility still further. Within the additional data channel, there is thus no definition of when transmission must be done. This means that each participant who wants to transmit can define for himself when he wants to transmit. Especially if a polling mode is attained, in which responses from further participants can result from a participant request, both request telegrams and response telegrams could be accommodated within the time slot of the additional channel.

The length of time between the question and the answer is determined for instance by the processing time of the participant being asked and is system-dependent.

If each participant is assigned his own instant for the beginning of transmission within the corresponding time slot for useful data, collisions are prevented. If each participant is allowed a certain transmission time, then it can be estimated relatively easily for the individual participant whether or when the line might be busy. Thus in the worst case scenario, if all the participants are transmitting simultaneously, they still have a predetermined priority resulting in the aforementioned transmission instants. If only one participant initially is transmitting, then he automatically receives the highest priority (see hereinafter).

It would also be conceivable to redefine the transmission instants for the beginning of transmission within each transmission cycle, for instance if the average length of the data telegrams changes. This adaptation could be done by means of a random generator realized in each participant, or could be predeterminable by an overriding control mechanism. An exchange of participant-specific instants for the beginning of transmission among the bus participants would also be conceivable.

The data in the additional channel can advantageously also be transmitted acyclically, that is, not upon each transmission cycle. Thus the channel is available only as needed and does not require real-time conditions. It can function as a backup channel and can optionally release bandwidth for process data.

If the data telegrams in the additional channel are incorporated in protocols, such as HTTP (Hyper Text Transfer Protocol), FTP (File Transfer Protocol), TELNET, and so forth, then these protocols may be used for displaying information and for configuring participants. Secure transmission is thus also feasible, and the use of standard stacks (Firmware modules), of the kind already available on a mass-produced basis in many operating systems, is possible. This makes the realization easier and is also economical, since these stacks do not have to be especially procured or developed from scratch. Another advantage, or the consequence of what has been mentioned above, is that routing, for instance from a PC to a drive via a controller, becomes very simple, since the controller merely has to hand on the IP telegram without interpretation and thus has a gateway functionality.

If the method is designed such that the participants automatically ascertain the allowable length of the data telegrams for useful data from knowledge of the cycle time and knowledge of the length of the process data time slot, and in particular also by means of the knowledge of the planned or predetermined transmission time per participant in the additional channel, then they can on their own adapt their transmission and reception structures accordingly. In contrast to the prior art, where all the relevant data have to be predetermined by the controller via field bus parameters, the dynamic administration of the bandwidth would then be maximally automated.

It can also be expedient if data telegrams are distributed over a plurality of transmission cycles. Longer data telegrams which because the bandwidth is too narrow can no longer be accommodated within the time slot would thus be transmitted over a plurality of cycles. Because of the time-critical requirements for the process data, this method might be of particular interest only for the additional data.

If at least one participant functions as an overriding primary participant and, particularly in the context of a system initialization and/or upon a startup of operation, communicates the allowable telegram length of the useful data to all the other participants, functioning as secondary participants, then the primary participant, as a kind of midlevel authority, takes over the interface between subordinate participants and overriding participant levels. Especially in complex applications, this hierarchical structure makes administration and control easier and makes it possible to increase the computing capacity. The primary participant and the secondary participant may in principle be identical in terms of their construction, but the primary participant is embodied as a communication master and is tied to higher communications levels. Initialization is made possible by parameters of the kind known for instance in data communication via field buses. One parameter may be provided for the chronological beginning, and a further parameter for the end within one transmission cycle. A modification in which for each transmission cycle, the master predetermines the location of the additional channel by means of a code would also be conceivable. This would be especially advantageous in communications systems that have a constantly varying communication cycle.

If a secondary participant receives a transmission authorization, in particular for process data, from the primary participant, then collisions in the exchange of process data can be avoided and optimal utilization of the bandwidth can be attained. In practical terms this is realized by providing that the participants deposit their data in a telegram furnished by the master, and the master then rereads the telegram.

If each participant can send useful data as needed even without a transmission authorization, then the participants entirely freely occupy the additional channel, which afterward is occupied by the fastest participant for the duration of the transmission event (see above). This method of communication can be attained without great effort or expense. However, in such a case, the majority of the communication even in the additional channel will be a master/slave coupling; that is, the controller polls the slaves, and the slaves respond only to this polling. As a result, the occupation is controlled in a targeted way by the master. The master can furthermore take over the control functions mentioned above and either once and for all or as needed, including upon each transmission cycle, define and monitor the instant for the allowable beginning of transmission of the participants within the additional channel.

The method of the invention is especially suitable if the participants are digital drives, controllers, intelligent measurement pickups, industrial PCs, or very generally electronic equipment with a bus connection, in particular for executing and regulating courses of motion in automated processes; the process data are set-point values and/or actual values for location, speed, and acceleration. The reason for this is that in automation technology, especially in conjunction with master control communication and configuration for drive regulators by means of bus systems, such as SERCOS® interface (SERCOS-III), both real-time-critical process data and additional data with requirements that are not so time-critical have to be transmitted. The aforementioned system initialization would be done by means of the S/P parameters, in the case of SERCOS® interface. The method could also be used on other buses, such as PROFINET or Powerlink.

BRIEF DESCRIPTION OF THE DRAWINGS

FIG. 1 shows the schematic representation of a transmission cycle 13 with a predetermined cycle time 13a and at least one first time slot 11 and at least one second time slot 12 along the time axis t; the first time slot 11 contains process data and the second time slot 12 contains additional data. Two data telegrams 16, 17 are also shown within the time slot 11 for process data, with data fields (HDR/MST) for synchronization and administration. The chronological beginning of transmission 14 with the resultant remaining transmission time 15 is also shown in the time slot 12.

DETAILED DESCRIPTION OF THE PREFERRED EMBODIMENT

It is assumed below that in a data bus with a transmission mechanism according to the invention, one participant is configured as the primary participant, and further participants function as secondary participants of equal rank.

The primary participant sends two data telegrams 16, 17, for instance, within the time slot 11, which is designated here as a process data channel. Set-point values for digital drives may for instance be contained in the first data telegram 16 within this process data channel 11, while actual values are contained in the data telegram 17. The process data channel 11 may as needed include still further data telegrams 16, 17 or pairs of data telegrams 16, 17, for instance as a function of the number of participants, for exchanging operation-relevant process data (such as speed or position data). Communication, preferably real-time communication, in the process data channel 11 is repeated upon each cycle 13, and the data are also updated at each cycle 13 as needed and depending on the application in question. The chronological length of the data telegrams (t0, t1) within the process data channel 11 as well as the telegram construction or the significance of the telegram contents (set-point values, actual values) as a rule remain constant. This structure can therefore be made known to all the participants. Via additional data fields, there might additionally be the possibility of identifying the secondary participants for the primary participant and setting up a purposeful communication with them. For coordination, the participant functioning as the primary participant could also grant transmission rights to the secondary participants, for the sake of optimal utilization of the process data channel 11.

Within the second time slot 12, random access is employed; that is, a participant can use the channel as needed, without explicitly being granted transmission authorization by the primary participant. Only data telegrams that are not very time-critical, for instance for configuration, administration, or diagnostic purposes, are transmitted here by means of protocols.

If a data telegram for additional data now requires a longer period of time for transmission than is intended or feasible within the time slot 12 per cycle 13, then the telegram length is shortened by the transmitting participant in such a way that appropriate transmission within the period length is nevertheless possible. In that case, the telegram is distributed as needed over a plurality of cycles 13. It is thus assured that the entire cycle time 13, for instance 62.5 μs, 125 μs, 250 μs, or multiples of them, can be fully utilized. Since the additional channel 12 seldom involves time-critical information, this distribution over a plurality of cycles does not cause any significant restriction. The allowable telegram length for the additional data thus depends on the cycle time 13 and on the length of the time slot 11 required for the process data channel. It would naturally also be conceivable to distribute the real-time data and the additional data over more than only two time slots 11, 12. Even the order of these time slots 11, 12 could be selected arbitrarily within one transmission cycle, so that for instance a process data slot 11 is followed by an additional data slot 12 which in turn is followed by a process data slot 11 again. To accomplish this, it must merely be fixedly defined which of the time slots will be polled cyclically and which will be polled acyclically.

The beginning of transmission 14 for the additional data in the corresponding time slot 12 can be varied within this time slot 12, and thus the telegram length increases or decreases as a function of this transmission instant. This allowable telegram length depends on the desired transmission rate and on the remaining time available. For example: length of process data slot 11, 20 μs; length of the transmission cycle 13, 60 μs. In this example, the length for the useful data time slot is 40 μs. From the desired transmission rate, such as 100 Mbit/s, an allowable length of the data telegrams for the useful data that results is 100 Mbit/s*40 μs=400 bits=50 bytes.

This transmission method is especially suitable for all applications in which it is necessary to regulate courses of motion and in which the process data must be transmitted time-critically in the form of set-point values and/or actual values for location, speed, acceleration, and possibly also pressure and temperature.

What is claimed is:

1. A method for data transmission between participants in industrial automation, selected from the group consisting of digital drives, controllers, intelligent measurement pickups, industrial PCs, said participants communicating by means of a data bus, comprising the following steps:

using at least one first and at least one second time slot (11, 12) for the exchange of data telegrams between the participants within a cycle time (13a) predetermined for one transmission cycle (13);

forwarding process data comprising at least one of set-point values and actual values for location and/or speed and/or acceleration by the at least one first time slot (11);

forwarding additional data by the at least one second time slot (12);

predetermining a length of the data telegrams representing the additional data within a length of the corresponding time slot (12);

varying the beginning of transmission (14) for a data telegram of the additional data within the length of the corresponding time slot (12);

employing random access within said at least one second time slot;

transmitting useful data by each participant as needed without a transmission authorization;

transmitting said data telegrams cyclically in one of said first and second time slots and transmitting said data telegrams acyclically in the other of said first and second time slots; and shortening the data telegram for additional data by a transmitting participant by distributing said data telegram over a plurality of cycles when the data telegram for additional data requires a longer period of time for transmission than is possible within the corresponding time slot.

2. The method as recited in claim 1, further comprising transmitting the process data in real time, periodically and upon each transmission cycle (13).

3. The method as recited in claim 1, further comprising distributing process data and/or additional data over more than two time slots (11, 12) of the same and/or different length and/or in a different order within one transmission cycle (13).

4. The method as recited in claim 1, further comprising assigning to each participant, within the corresponding time slot (12), a fixed instant for the beginning of transmission (14).

5. The method as recited in claim 4, further comprising redefining the instant for the beginning of transmission (14) within each transmission cycle (13) by means of a participant-specific random generator or an overriding control mechanism.

6. The method as recited in claim 1, further comprising acyclically transmitting the data in the second channel.

7. The method as recited in claim 1, further comprising incorporating data telegrams in protocols.

8. The method as recited in claim 1, wherein the participants, from knowledge of the cycle time (13a) and knowledge of the length of the process data time slot (11), ascertain the allowable length of the data telegrams for additional data by means of knowledge of the predeterminable transmission time per participant in the additional channel.

9. The method as recited in claim 8, wherein the participants adapt their transmission and reception structures dynamically, based on the knowledge of the length of the data telegrams for additional data.

10. The method as recited in claim 1, further comprising distributing data telegrams over at least two transmission cycles (13).

11. The method as recited in claim 1, wherein at least one participant functions as an overriding primary participant and, in the context of a system initialization and/or upon a startup of operation, communicates an allowable telegram length of the additional data to all other participants, functioning as secondary participants.

12. The method as recited in claim 11, wherein secondary participants obtain transmission authorizations for process data, from the primary participant.

13. The method as recited in claim 1, wherein the participants are digital drives and/or controllers for executing or regulating courses of motion in automated processes, and the process data are set-point values and/or data of electrical measurement systems.

* * * * *